No. 712,846. Patented Nov. 4, 1902.
E. L. POST.
SAW TOOL.
(Application filed July 5, 1900. Renewed July 15, 1902.)
(No Model.) 2 Sheets—Sheet 1.
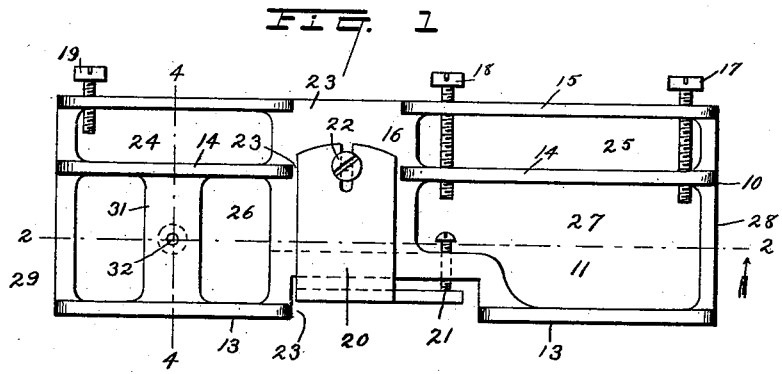
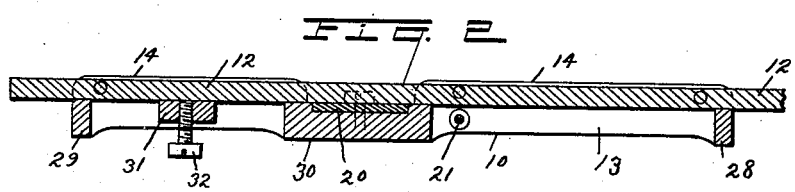
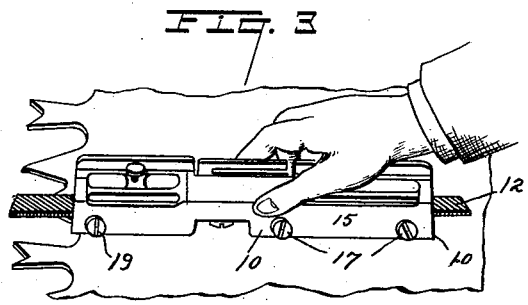
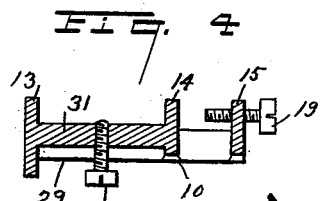
WITNESSES
INVENTOR
BY
ATTORNEYS No. 712,846. Patented Nov. 4, 1902.
E. L. POST.
SAW TOOL.
(Application filed July 5, 1900. Renewed July 15, 1902.)
(No Model.) 2 Sheets—Sheet 2.
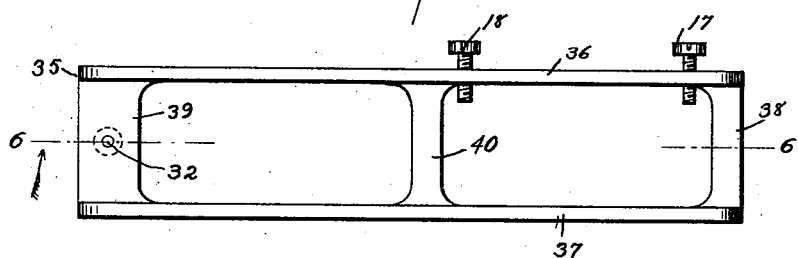
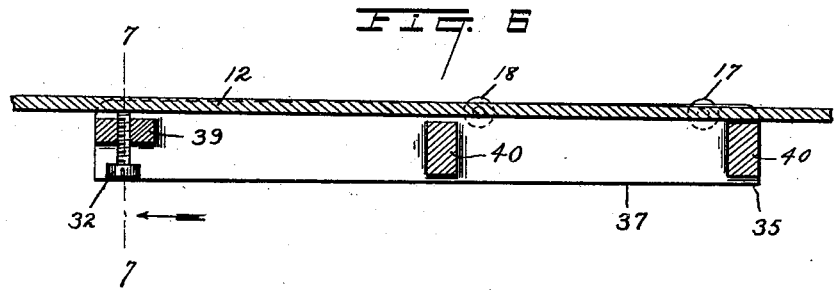
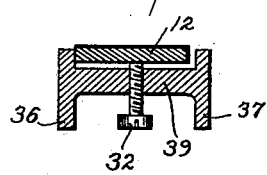
WITNESSES
INVENTOR
BY
ATTORNEYS
THE NORRIS PETERS CO., PHOTO-LITHO., WASHINGTON, D. C.

UNITED STATES PATENT OFFICE.

EZRA L. POST, OF NEW YORK, N. Y.

SAW-TOOL.

SPECIFICATION forming part of Letters Patent No. 712,846, dated November 4, 1902.

Application filed July 5, 1900. Renewed July 15, 1902. Serial No. 115,742. (No model.)

*To all whom it may concern:*

Be it known that I, EZRA L. POST, a citizen of the United States, residing at New York, in the county of New York and State of New York, have invented certain new and useful Improvements in Saw-Tools, of which the following is a full and complete specification, such as will enable those skilled in the art to which it appertains to make and use the same.
This invention relates to saw-tools, and is an improvement on the saw-tool described and claimed in United States Letters Patent No. 639,285, granted to me December 19, 1899. The saw-tool described and claimed in the patent referred to is a combination-tool designed for use in setting the teeth of a saw, for fixing the circular curve of the teeth of a large saw and properly gaging the same, also for regulating the length of the raker-teeth and for testing the set of the teeth and side-dressing the same; and the object of this invention is to improve that part of said tool which relates to the testing and side-dressing of the teeth of a saw, and the improvement described and claimed herein may, as hereinafter shown and described, be applied to the combination-tool referred to or may be involved in a single tool used only for the purpose of testing the teeth of a saw and side-dressing the same, as is also herein shown and described.

The invention is fully disclosed in the following specification, of which the accompanying drawings form a part, in which the separate parts of my improvement are designated by the same reference characters in each of the views, and in which—

Figure 1 is a bottom plan view of a combination-tool embodying my improvement; Fig. 2, a longitudinal section on the line 2 2 of Fig. 1 and showing a file for testing and side-dressing the teeth of a saw in position; Fig. 3, a perspective view showing the method of operating the tool; Fig. 4, a cross-section on the line 4 4 of Fig. 1; Fig. 5, a view similar to Fig. 1, showing a modified form of construction; Fig. 6, a longitudinal section on the line 6 6 of Fig. 5, showing the file in position; and Fig. 7, a section on the line 7 7 of Fig. 6.

In Figs. 1 to 4 of the drawings I have shown my improvement applied to the combination- tool hereinbefore referred to and shown and described in United States Patent No. 639,285, granted to me December 19, 1899, and in Figs. 5 to 7 I have shown my improvement embodied in a tool designed only for the purpose of testing the set and side-dressing the teeth of a saw.

It will be understood that my improved tool, as in the case of the patent referred to, is designed for use, primarily, in connection with large saws, such as cross-cut saws and others of this class, and in the practice of my invention, referring to the construction shown in Figs. 1 to 4, I provide a tool of the class described which for the purpose of this description I will describe as having a top and bottom and a front and back side, the bottom of the tool being shown in Fig. 1 and the front thereof in Fig. 3.

The tool comprises a stock or body 10, having in the bottom thereof a longitudinal space 11, designed to receive a file 12, and this space is formed by a back side wall 13 and a supplemental parallel front side wall 14, adjacent to which and parallel therewith is the front side wall proper of the tool, as shown at 15, between which and the wall 14 is a longitudinal space 16, similar to the longitudinal space 11, but narrower, and passing through the walls 14 and 15, adjacent to the right-hand end of the tool and near the middle thereof, are screws 17 and 18, and through the wall 15, adjacent to the left-hand end of the tool, is passed a screw 19, which in this improvement has no function. The drawings also show other parts 20, 21, and 22, which for the purposes of this improvement have no function, said parts being fully described and claimed in the patent referred to, and the walls 13, 14, and 15 are cut out centrally or provided with open spaces 23, which also form no part of this invention, the object in showing the same in this connection being to show the application of my present improvement to the construction described and claimed in the patent above referred to.

The stock or body portion of the tool is also provided with oblong open spaces 24, 25, 26, and 27, designed to decrease the weight of the tool, and by means of the open spaces 26 and 27 the longitudinal space 11, in which the file is placed, is provided with end cross-bars 28 and 29 at the right and left hand ends of the tool, respectively. In this form of construction there is also a transverse central piece 30, and the bottoms of the transverse end pieces or cross-bars 28 and 29 are in the same horizontal plane, as is also the bottom surface of the central cross-piece 30.

The file 12 may be of any preferred or of the usual construction and may be thinner at one end than at the other or of the same thickness throughout, as shown in the drawings, and passing through a suitable transverse support 31 at or adjacent the left-hand end of the tool is a set-screw 32, which is adapted to bear on the top surface of the file 12, and the screws 17 and 18 are designed to hold the file in the longitudinal space 11, in which when in use it is placed.

The bottom surfaces of the back side wall 13 and the parallel front side wall 14 of the space 11, in which the file is placed, are in the same horizontal plane and form a bearing-surface for the tool on the saw when the tool is in use, and the operation of testing the set and side-dressing the teeth of a saw is shown in Fig. 3. For this purpose the file 12 is secured in place by the screws 17 and 18, which bear on one of the side edges thereof, and said tool is passed over or transversely of the saw, the tool being held in the position shown in said figure, and the position of the front end of the file is regulated by the screw 32, it being understood that the file must be depressed by said screw below the level of the bearing-surface of the walls 13 and 14 at the left-hand end of the tool, and by properly adjusting the position of the left-hand end of the file by means of the set-screw 32 the set of the teeth may be exactly regulated and made uniform, and said teeth may be properly dressed in the manner of ordinary tools of this class or the same as with the tool described and claimed in the patent referred to.

In the patent referred to the end bearings, consisting of the transverse bars 28 and 29, were not in the same parallel plane, the transverse bearing or support at the left-hand end of the tool being lower than that at the right, and in order to properly adjust the file at the left-hand end of the tool it was necessary to slide said file longitudinally of the tool, and in order to do this it was necessary to loosen and retighten the screws 17 and 18. The file used in said tool is also an ordinary file, thicker at one end than at the other, and the sliding of the same longitudinally of the stock or holder would raise or lower the left-hand end of said file. In this case, however, the file may be of the same thickness at both ends, or it may be of the ordinary form, thicker at one end than at the other, and only one of the screws 17 and 18 is necessary, the screw 17 being preferred, and this screw or both of said screws together will hold the file in place when the left-hand end thereof is depressed, it being understood that the movement of the said left-hand end of the file at any time is very slight.

In Figs. 5 to 7 of the drawings I have shown my improvement involved in a tool of much simpler form, the only object of which is to provide means for testing the set and side-dressing the teeth of a saw. This tool consists of a body or stock 35, which is oblong in form and provided at one side with a longitudinal space, in which the file 12 is placed. The tool is also provided with a front side wall 36 and a back side wall 37, cross end bars or supports 38 and 39, and a central cross-piece 40; but it will be understood that the body or stock of the tool may be of any desired construction, all that is necessary being to provide a body or stock having a longitudinal space in one side thereof designed to receive the file 12, and the bottoms of the side walls of which form a bearing-surface for the tool when used on a saw. In this case the set-screw 32 is passed through the end bar or support 39 at the left-hand end of the tool, and the said tool is provided at the front side thereof with the set-screws 17 and 18, as in the construction shown in Figs. 1 to 4. These screws 17 and 18 hold the file in position and the set-screw 32 serves to adjust the position of the left-hand end of the file exactly as hereinbefore described with reference to the construction shown in Figs. 1 to 4.

In Figs. 6 and 7 the left-hand end of the file is shown slightly depressed by the screw 32, as when in use, and by means of this device the set of the teeth may be tested and the side-dressing thereof is accomplished exactly as with the construction hereinbefore shown and described. It will be understood that Fig. 5 is a bottom plan view of the tool, and the tool is shown bottom up in both Figs. 6 and 7, and the method of using this tool is the same as the method of using that shown in Fig. 3.

Having fully described my invention, I claim as new and desire to secure by Letters Patent—

1. A saw-tool, comprising an oblong stock or body having a longitudinal space in one side designed to receive a file, and the side walls of which form a bearing-surface for the tool, the end supports of the file being in the same horizontal plane, and the side walls of the tool at one end being provided with set-screw for holding the file in place, and said tool being provided at the opposite end with means for adjusting the position of the end of the file, substantially as shown and described.

2. A saw-tool, comprising an oblong stock or body having a longitudinal space in one side designed to receive a file, and the side walls of which form a bearing-surface for the tool the end supports of the file being in the same horizontal plane, and the side walls of the tool at one end being provided with set-screw for holding the file in place, and said tool being provided at the opposite end with means for adjusting the position of the end of the file, consisting of a screw passing vertically through a support and adapted to bear on the file, substantially as shown and described.

In testimony that I claim the foregoing as my invention I have signed my name, in presence of the subscribing witnesses, this 25th day of June, 1900.

EZRA L. POST.

Witnesses:
F. A. STEWART,
C. C. OLSEN.